H. A. TUTTLE.
REVERSING GEARING.
APPLICATION FILED FEB. 21, 1916.
1,221,113.
Patented Apr. 3, 1917.
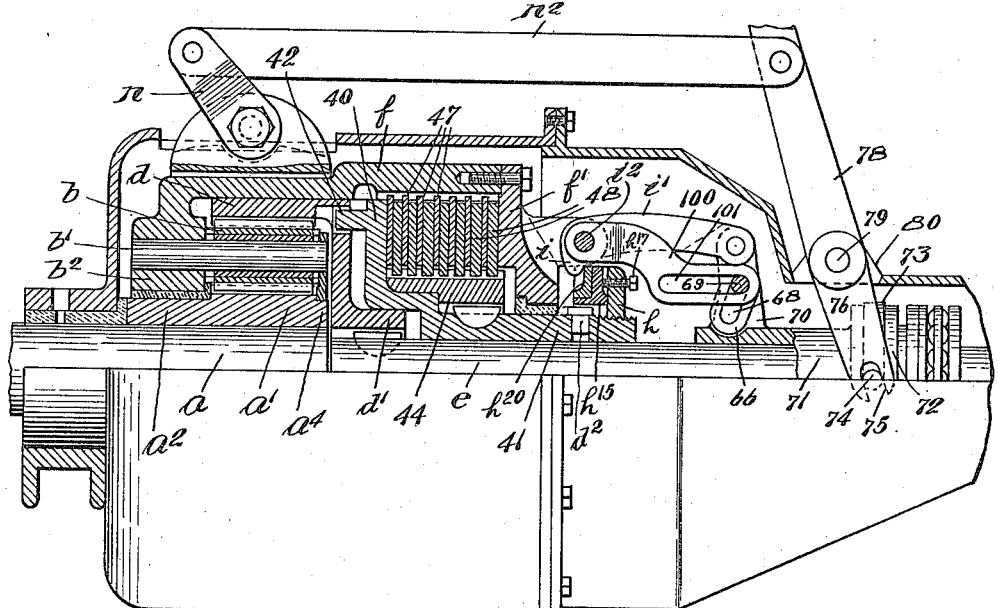
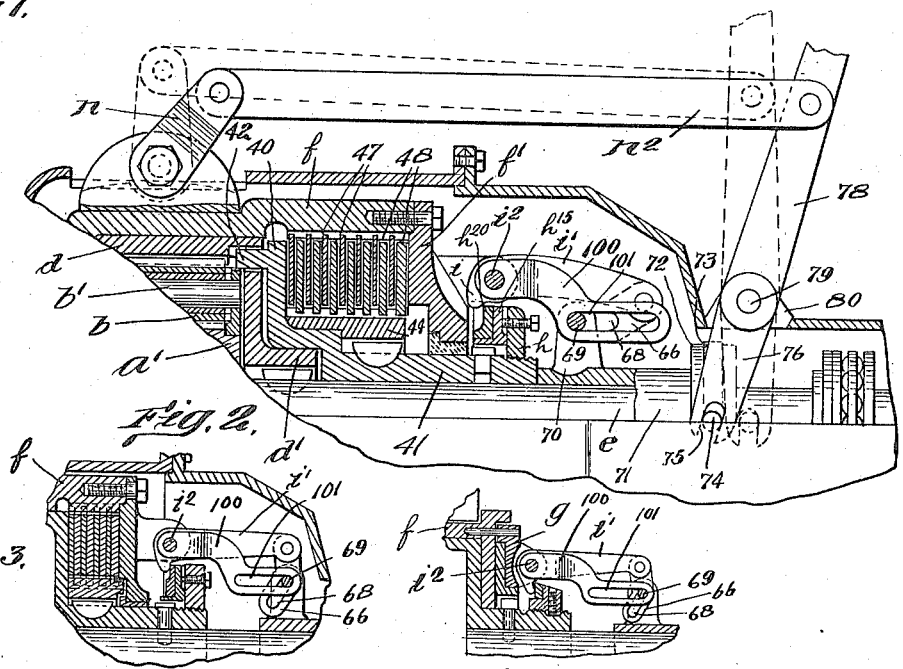
Witness,
H. B. Davis.
Inventor,
Henry A. Tuttle
by Noyes & Harriman
Attys.

UNITED STATES PATENT OFFICE.

HENRY A. TUTTLE, OF TAUNTON, MASSACHUSETTS.

REVERSING-GEARING.

1,221,113.     Specification of Letters Patent.     Patented Apr. 3, 1917.

Application filed February 21, 1916. Serial No. 79,545.

*To all whom it may concern:*

Be it known that I, HENRY A. TUTTLE, a citizen of the United States, residing at Taunton, in the county of Bristol and State of Massachusetts, have invented an Improvement in Reversing-Gearing, of which the following is a specification.

This invention relates to reversing-gearing, and is intended as an improvement upon the reversing-gearing of Letters Patent #1,169,762, and #1,168,764, dated January 18, 1916, yet may be applied to other forms of reversing-gearing.

The reversing-gearing of said patents consists of a driving-shaft, a driven-shaft, gearing connecting said shafts and associated brake-mechanism to secure reverse drive and clutch-mechanism connecting said shafts to secure forward drive, said clutch-mechanism having an axially movable operating-member, and actuating-means for said clutch operating-member and brake-mechanism, which is movable in one direction from normal to actuate the clutch-operating-member and cause engagement of the clutch-members, and in the other direction from normal to set the brake. The actuating-means comprises a sliding sleeve, and link and lever mechanism connecting said sleeve with the clutch-operating-member.

It occasionally happens when moving the actuating-means from normal, in a direction to cause engagement of the clutch-mechanism, that it is moved too far, and, as a result, the clutch-members which are moved into engaging position are moved out of such engaging-position, by such continued movement of the actuating-means in the same direction, or the engaging pressure is relieved, which is very objectionable.

This invention has for its object the provision of means for limiting the movement of the actuating-means in a direction to operate the clutch-mechanism at a time the clutch-members are in engaging-position, so that no further movement of said means in such direction is possible; said limiting-means, however, permitting movement of the actuating-means in the other direction from normal; and by said limiting means being arranged on some component part of the reversing-gearing, independent of the driven-shaft, being thus located between the reversing-gear elements and the actuating-means for the clutch-mechanism. By such limiting-means, the objection above noted is overcome.

Figure 1 is a side elevation and partial longitudinal vertical section of one form of reversing gearing embodying this invention.

Fig. 2 is a similar view illustrating the parts in different positions.

Figs. 3 and 4 are fragmentary details of other forms of reversing-gearing.

The reversing-gearing shown in Figs. 1 and 2, is that of Letters Patent #1,168,764, and comprises a driving-shaft $a$, spur-gear $a'$, secured to it, several pinions $b$, arranged about said spur-gear and in engagement therewith, and studs $b'$, on which said pinions freely rotate. The studs $b'$ are fixed to one end wall $b^2$ of an inclosing-case, of which $f$ represents the cylindrical body, and $f'$ the other end wall. The pinions $b$ also engage the teeth of an internal gear $d$, having a hub $d'$ which is secured to the driven-shaft $e$, said internal gear being arranged within the cylindrical body $f$ of the case or pinion-carrier. The internal gear loosely fits the cylindrical body $f$ of the pinion-carrier or case, and both said gear and pinion carrier are free to rotate independently of each other, but when it is desired to drive the driven-shaft forward in the same direction as that in which the driving-shaft is rotating, the pinion-carrier or case is adapted to be connected with one of the shafts, as the driven-shaft.

In this particular structure, the pinion-carrier is adapted to be connected with the internal gear which latter is secured to the driven-shaft.

Clutch-mechanism is provided for connecting said pinion carrier or case with the internal gear, and, as here shown, the cylindrical body $f$ of the case is extended a considerable distance beyond the end or crown of the internal gear to form a large space between said gear and the wall $f'$ of the case, and in said space the clutch-mechanism is arranged. The clutch-members consist of a plurality of friction clutch-plates 47, 48, arranged alternately with respect to each other, and said plates are arranged between the end wall $f'$ of the case and an axially movable plate 40. The end-wall $f'$ is held against axial movement, but the plate 40 is movable axially to in turn move the clutch-plates axially for engagement. The plate 40 is made circular, and has a hub 41 which embraces the driven-shaft $e$, and extends through a center-hole in the end wall $f'$, so that one end of the pinion-carrier or case is supported upon it. One side of the plate 40 is formed with a friction face for engagement with the endmost clutch-plate, and the other side is formed to provide for sliding engagement with the crown of the internal gear, and, as here shown, several lugs 42 are formed on it which enter holes formed in the crown of the internal gear. As the plate 40 is moved axially, its lugs will be slid longitudinally in said holes, but engagement with the internal gear will be continuous. Some of the clutch-plates are arranged to slidably engage the interior of the pinion-carrier or case, and others to slidably engage the exterior of a collar 44, secured to the hub 41, of the axially movable clutch-operating member. As the collar is secured to the hub of the axially movable clutch-operating member 40, and as said member is continuously in engagement with the internal gear, and as said internal gear is secured to the driven-shaft, the clutch-plates 48 are indirectly connected with the driven-shaft, whereas, the clutch-plates 47 are connected with the pinion-carrier or case, so that when the clutch-plates 47, 48, are in engagement, the pinion-carrier or case is connected with the internal gear, and hence with the driven-shaft.

To move the clutch-operating member 40, axially in both directions, the hub 41 of the clutch-operating-member, which extends through the center-hole in the end wall $f'$, is further extended for a considerable distance, and has arranged on it a threaded collar $h$, which is adjustable thereon, and an annular plate $h^{15}$, adjacent said collar which is recessed at several places to receive a screw $h^{17}$, which projects from the inner face of said collar, thus permitting adjustment of said plate. Said plate $h^{15}$ has key-ways to receive the square heads of pins $d^2$, and also is cut away on its side opposite the collar to receive a ring $h^{20}$, which is recessed at several places to receive projections $i$ on operating-levers $i'$, which levers are pivoted at $i^2$ to ears 65 formed on and extended outwardly from the end wall $f'$ of the pinion-carrier or case. To the outer bifurcated ends of said levers $i'$, obtuse angled links 66 are pivotally connected, said links having elongated slots 68, which receive pins 69, extended laterally from ears 70, projecting from the hub 71 of a thrust-collar 72, mounted loosely on the driven-shaft $e$, and adapted to be moved longitudinally thereon. Said thrust-collar receives a yoke 73, having pins 74, extended from it in opposite ways, which enter notches 75, formed in the extremities of arms 76, of the actuating-lever 78, fulcrumed at 79, in ears 80, formed on and projecting from an outer projecting shell which is provided for the gearing. Movement of the actuating-lever 78, in one direction, as for instance, toward the left from vertical or normal, see Fig. 1, operates to slide the thrust-collar along on the shaft $e$ in the opposite direction, thereby to move the links 66 and in turn move the levers $i$ and cause the projections on said levers to engage and move the clutch-operating member 40, to move the clutch-plates axially into engagement with each other and with the end wall $f'$ of the pinion-carrier or case. Movement of said actuating-lever 78 back to its vertical or neutral position, see dotted lines Fig. 2, operates to move the thrust-collar in a direction toward the left to move the links 66, into the full line position there shown, and thereby move the operating-levers to disengage and permit axial movement of the clutch-operating member 40, sufficient to relieve the pressure upon the clutch-plates. Movement of said actuating-lever 78 to the right of its vertical, neutral, or normal position, see full lines Fig. 2, which is provided particularly for operating the brake-mechanism, as will be described, also operates to move thrust-collar farther in a direction toward the left, to cause the end of the hub of the thrust-collar to engage the end of the hub 41, of the clutch-operating member, thereby to move said member a short distance in a direction toward the left to positively insure disengagement of the clutch-plates, and during such movement the pins 69 move along in the slots in the links 66, until they arrive at the ends of said slots, thus limiting the movement. The brake-mechanism for the pinion-carrier or case has an operating-member $n$ which is connected by a link $n^2$ with the actuating-lever 78, and is moved by said lever, and when said lever is moved from its normal position in a direction toward the right, said link is moved longitudinally and the operating-member $n$ is turned to operate the brake-mechanism.

When moving the actuating-lever in a direction toward the left, from normal, to operate the clutch-mechanism, the link and lever connections between the thrust-collar or some equivalent sliding element and the clutch-mechanism or axially movable clutch-operating-member, are moved, and, in case such movement shall be continued too far, the links 66 will be carried beyond the center and when so moved, will relieve the pressure of the levers $i$ on the clutch-operating-member, whereupon said member is permitted to move and relieve its pressure on the clutch-plates. This is a serious objection. Herein limiting-means are provided for the thrust-collar by which its movement in this direction is checked at a predetermined point, beyond which it cannot be moved. This point is the point where maximum pressure is exerted upon the clutch-operating-member. One means for carrying out this feature is here shown which is sufficient to illustrate one embodiment of my invention, and consists of links 100, two or more usually being employed, which are made alike, or substantially so, and are loosely or pivotally supported at one end, as for instance, they may be mounted on the pivot-pins $i^2$ on which the levers $i'$ are mounted, although they may be elsewhere supported. The other ends of said links are formed with elongated slots 101, which receive the pins 69, which work in slots of the links 66, thus to connect with the thrust-collar. Movement of the thrust-collar is limited by the pins 69 engaging the ends of the slots 101. The pins $i^2$ and 69 are employed for convenience, merely, as it is obvious that other means may be employed for loosely connecting the links 100 with the thrust-collar. The slots 101 in said links are made long enough to admit of movement of the thrust-collar in a direction toward the right from normal for the purpose of permitting operation of the brake-mechanism, and, during such movement, the pins 69 will move along in said slots. It is obvious that other means may be employed in lieu of the links here shown for limiting the movement of the thrust-collar in one direction and permitting movement thereof in the other direction, which will serve as an equivalent for the slotted links 100, here shown.

Referring to Fig. 3, a fragment of the reversing gearing of Patent No. 1,168,762, is shown, wherein the case $f$ which is arranged to constitute the pinion-carrier is movable axially and is adapted to serve as the clutch-operating-member, and, in this instance, the slotted links 100 are employed in substantially the same manner as heretofore described, they being pivotally supported on the pivot pins $i^2$, and their slotted end-portions arranged for engagement with the pins 69.

Referring to Fig. 4, a fragment of the reversing gearing of Patent No. 901,664, is shown, wherein the clutch plates are arranged outside of the case $f$, the endmost plate $g$ having links $i'$ pivotally connected to it at $i^2$, and, in this instance, the slotted links 100 may be employed, they being arranged on the pivot-pins $i^2$, and their slotted end-portions arranged for engagement with the pins 69.

From these illustrations, it is obvious that various forms of reversing-gearing having an axially movable clutch-operating-member, a sliding element, and a link-and-lever mechanism, may be provided with slotted links 100, or equivalent means for limiting movement of said sliding element in a direction to move the clutch operating member to cause engagement of the clutch plates.

I claim:—

1. In a reversing-gearing, a driving-shaft, a driven-shaft, gearing connecting said shafts, including a brake-mechanism to secure reverse drive, a clutch-mechanism to secure forward drive, actuating-means arranged to operate said mechanisms which is movable in one direction from normal to operate the clutch-mechanism, and in the other direction from normal to operate the brake-mechanism, and means arranged on one of the elements of the gearing, independently of the driven-shaft, to limit the movement of said actuating-means in a direction to operate the clutch-mechanism.

2. In a reversing-gearing, a driving-shaft, a driven-shaft, gearing connecting said shafts including a brake-mechanism to secure reverse drive, a clutch-mechanism to secure forward drive, a slidable element, means operatively connecting said element with the brake-mechanism and clutch-mechanism, means for sliding said element in one direction from normal for operating the clutch-mechanism, and means arranged between the gearing and slidable element, independent of the driven-shaft, for limiting its movement in such direction, said element being slidable in the opposite direction from normal by said means, to admit of operation of the brake-mechanism.

3. In a reversing-gearing, a driving-shaft, a driven-shaft, gearing connecting said shafts including a brake-mechanism to secure reverse drive, a clutch-mechanism to secure forward drive, a slidable element, means operatively connecting said element with the brake-mechanism and clutch-mechanism, means for sliding said element in one direction from normal for operating the clutch-mechanism, and slotted links connected at one end with said slidable element and at their other ends with a member, by which movement of said element in such direction is limited, sliding movement of said element in the opposite direction from normal being permitted to admit of the operation of the brake-mechanism.

4. In a reversing-gearing, a driving-shaft, a driven-shaft, gearing connecting said shafts including a brake-mechanism to secure reverse drive, a clutch-mechanism to secure forward drive, a slidable element, means operatively connecting said element with the brake-mechanism and clutch-mechanism, means for sliding said element in one direction from normal for operating the clutch-mechanism, links connected at one end with a member, said links being slotted to limit the movement of said element in a direction to operate the clutch-mechanism, and to permit movement of said element in the opposite direction from normal, to admit of operation of the brake-mechanism.

5. In a reversing-gearing, a driving-shaft, a driven-shaft, gearing connecting said shafts including a brake-mechanism to secure reverse drive, a clutch-mechanism to secure forward drive, a slidable sleeve, means operatively connecting the sleeve with the brake-mechanism and clutch-mechanism, the operative connections with the clutch-mechanisms comprising pivoted levers and slotted links loosely connected together, and said sleeve being slidable in one direction from normal to operate the clutch-mechanism and in the opposite direction from normal to permit operation of the brake-mechanism, and slotted links connected at one end with said sleeve and at the other ends to a member, by which movement of said sleeve in a direction to operate the clutch-mechanism is limited, the slots in said links permitting movement of said sleeve in the opposite direction from normal.

6. In a reversing-gearing, a driving-shaft, a driven-shaft, gearing connecting said shafts, including a brake-mechanism to secure reverse drive, a clutch-mechanism to secure forward drive, a slidable sleeve, means operatively connecting the sleeve with the brake-mechanism and clutch-mechanism, the operative connections with the clutch-mechanism comprising pivoted levers and slotted links loosely connected together, said sleeve being slidable in one direction from normal to operate the clutch-mechanism and in the opposite direction from normal to permit operation of the brake-mechanism, and links mounted at one end of the pivots of the levers, the other ends thereof having slots which receive pins arranged on the sleeve, for limiting movement of said sleeve in a direction to operate the clutch-mechanism, and permit movement thereof in the other direction from normal.

7. In a reversing-gearing, a driving-shaft, a driven-shaft, gearing connecting said shafts including a brake-mechanism to secure reverse drive, a clutch-mechanism to secure forward drive, having an axially movable clutch-operating-member, a sliding element, link and lever mechanism connected with said sliding element and arranged to move axially said clutch-operating member, means to move said sliding element in one direction from normal to operate the clutch-operating member, said means being operatively connected with the brake-mechanism, and means arranged between the gearing and sliding element to limit movement of said element in its direction from normal to operate the clutch-mechanism which permits movement of said element in the opposite direction from normal.

8. A reversing-gearing including a driving-shaft, a driven-shaft, gearing connecting said shafts including a brake-mechanism to secure reverse drive, a clutch-mechanism to secure forward drive, having an axially movable clutch operating member, pivotally supported levers having projections, a sliding element, slotted links connecting said levers with said element, means arranged for movement in one direction from normal to move said element, whereby the links and levers will be moved to operate the clutch-mechanism, means arranged between the gearing and sliding element to limit the movement of said element in such direction, said operating-means being operatively connected with the brake-mechanism and arranged for movement in the other direction from normal to operate the brake-mechanism.

9. A reversing-gearing including a driving-shaft, a driven-shaft, gearing connecting said shafts including a non-axially movable pinion carrier and a brake-mechanism to secure reverse drive, a clutch-mechanism to secure forward drive having axially movable clutch operating-means, a sliding element, means connecting said sliding element with said clutch operating-means, means arranged for movement in one direction from normal to move said sliding element to operate the clutch-mechanism, and means arranged on the non-axially movable case to limit the movement in such direction, said operating-means being movable in the other direction from normal to operate the brake-mechanism.

10. A reversing-gearing including a driving-shaft, a driven-shaft, gearing connecting said shafts including a brake-mechanism to secure reverse drive, a clutch-mechanism to secure forward drive, having an axially movable clutch-operating-member, a non-axially movable inclosing case, levers pivotally connected to said case having projections for engaging said clutch-operating member, a sliding element, slotted links connecting said levers with said element, actuating-means arranged for movement in one direction from normal to correspondingly move said element whereby the links and levers will be moved to operate the clutch-mechanism, slotted links connecting said sliding element with said case, arranged to limit movement of said element in a direction from normal to operate the clutch-mechanism and permit movement thereof in the opposite direction from normal, said actuating-means being operatively connected with the brake-mechanism and arranged for movement in the other direction from normal to operate the brake-mechanism.

11. A reversing-gearing including a driving-shaft, a driven-shaft, gearing connecting said shafts including a brake-mechanism to secure reverse drive, a clutch-mechanism to secure forward drive, having an axially movable clutch-operating-member, a non-axially movable inclosing case, levers pivotally connected with said case having projections for engaging said member, a sliding element, slotted links connecting said levers with said element, actuating-means arranged to move said element in one direction from normal whereby the links and levers will be moved to operate the clutch-mechanism, links pivoted at one end to said case, having their other ends slotted for connection with the sliding element, to limit its movement in such direction from normal and permitting movement thereof in the opposite direction from normal, said actuating-means being operatively connected with the brake-mechanism, and arranged for movement in the opposite direction from normal to operate said mechanism.

In testimony whereof, I have signed my name to this specification, in the presence of two subscribing witnesses.

HENRY A. TUTTLE.

Witnesses:
B. J. NOYES,
H. B. DAVIS.

Copies of this patent may be obtained for five cents each, by addressing the "Commissioner of Patents, Washington, D. C."